United States Patent
Chen et al.

(10) Patent No.: US 9,870,602 B2
(45) Date of Patent: Jan. 16, 2018

(54) METHOD AND APPARATUS FOR FUSING A FIRST IMAGE AND A SECOND IMAGE

(71) Applicant: Huawei Device Co., Ltd., Shenzhen (CN)

(72) Inventors: Gang Chen, Beijing (CN); Jian Zhang, Shenzhen (CN); Wei Luo, Shanghai (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 0 days.

(21) Appl. No.: 15/101,759

(22) PCT Filed: Dec. 4, 2014

(86) PCT No.: PCT/CN2014/093024
§ 371 (c)(1),
(2) Date: Jun. 3, 2016

(87) PCT Pub. No.: WO2015/081870
PCT Pub. Date: Jun. 11, 2015

(65) Prior Publication Data
US 2016/0307300 A1 Oct. 20, 2016

(30) Foreign Application Priority Data
Dec. 6, 2013 (CN) .......................... 2013 1 0658550

(51) Int. Cl.
*H04N 5/225* (2006.01)
*G06T 3/40* (2006.01)
(Continued)

(52) U.S. Cl.
CPC .............. *G06T 3/4053* (2013.01); *G06T 3/20* (2013.01); *H04N 5/211* (2013.01);
(Continued)

(58) Field of Classification Search
CPC .......................... H04N 5/3415; H04N 5/23238
(Continued)

(56) References Cited

U.S. PATENT DOCUMENTS

| 6,208,765 B1 | 3/2001 | Bergen | |
|---|---|---|---|
| 2004/0196378 A1* | 10/2004 | Kannermark | H04N 5/2258 348/207.99 |

(Continued)

FOREIGN PATENT DOCUMENTS

| CN | 1879401 A | 12/2006 |
|---|---|---|
| CN | 101930602 A | 12/2010 |

(Continued)

OTHER PUBLICATIONS

Esmaeil Faramarzi et al., "Space-Time Super-Resolution From Multiple-Videos", The 11th International Conference on Information Sciences, Signal Processing and their Applications: Main Tracks, IEEE 2012, p. 23-28.

*Primary Examiner* — Twyler Haskins
*Assistant Examiner* — Dwight C Tejano (57) ABSTRACT

The present invention provides a method to resolve a technical problem of a "ghost". The method is applied to a terminal that includes a first camera lens and a second camera lens, where the both lenses are located on a same side of the terminal. The method includes: obtaining a first image that is captured by the first camera lens and is about a first area, and a second image that is captured at a same moment by the second camera lens and is about a second area; performing translation compensation on the second image by using the first image as a reference image; and fusing the first image and the second image that is obtained after translation compensation is performed, to generate a (Continued)

third image, where a resolution of the third image is higher than a resolution of the first image and a resolution of the second image.

7 Claims, 8 Drawing Sheets (51) Int. Cl.
H04N 5/232 (2006.01)
G06T 3/20 (2006.01)
H04N 5/21 (2006.01)
H04N 5/247 (2006.01)
H04N 5/262 (2006.01)
H04N 5/265 (2006.01)

(52) U.S. Cl.
CPC ..... *H04N 5/23232* (2013.01); *H04N 5/23248* (2013.01); *H04N 5/247* (2013.01); *H04N 5/265* (2013.01); *H04N 5/2621* (2013.01); *G06T 2207/10004* (2013.01)

(58) Field of Classification Search
USPC .......................................................... 348/38
See application file for complete search history.

(56) References Cited

U.S. PATENT DOCUMENTS

| | | | |
|---|---|---|---|
| 2007/0103544 A1* | 5/2007 | Nakazawa | H04N 5/232 348/38 |
| 2009/0290033 A1* | 11/2009 | Jones | G08B 13/19693 348/218.1 |
| 2010/0103175 A1 | 4/2010 | Okutomi et al. | |
| 2010/0232703 A1 | 9/2010 | Aiso | |
| 2011/0007184 A1* | 1/2011 | Lee | H04N 3/1593 348/231.99 |
| 2012/0105579 A1* | 5/2012 | Jeon | H04N 5/2258 348/38 |
| 2012/0147205 A1 | 6/2012 | Lelescu et al. | |
| 2013/0113876 A1* | 5/2013 | Zhao | H04N 7/15 348/38 |
| 2013/0141524 A1* | 6/2013 | Karunamuni | G06T 3/4038 348/38 |
| 2013/0141526 A1* | 6/2013 | Banta | H04N 5/23238 348/38 |
| 2013/0147910 A1* | 6/2013 | Xin | H04N 5/23238 348/38 |

FOREIGN PATENT DOCUMENTS

| | | |
|---|---|---|
| CN | 102075679 A | 5/2011 |
| CN | 102314678 A | 1/2012 |
| CN | 202143153 U | 2/2012 |
| CN | 102496158 A | 6/2012 |
| CN | 103685951 A | 3/2014 |
| KR | 10-0597587 B1 | 6/2006 |
| WO | 00/13423 A1 | 3/2000 |
| WO | 2009/151903 A2 | 12/2009 |

* cited by examiner

```
                                                    S601
Determine a common area of a first image and a second image
     according to a result of translation compensation S602
Fuse the common area of the first image and the second image
              to generate a third image
```

METHOD AND APPARATUS FOR FUSING A FIRST IMAGE AND A SECOND IMAGE

CROSS REFERENCE TO RELATED APPLICATIONS

The present application claims priority under 35 U.S.C. §365 to International Patent Application No. PCT/CN2014/093024 filed on Dec. 4, 2014 and Chinese Patent Application No. 201310658550.8 filed on Dec. 6, 2013, which are incorporated herein by reference into the present disclosure as if fully set forth herein.

TECHNICAL FIELD

The present invention relates to the field of image applications, and in particular, to an image processing method and apparatus, and a terminal.

BACKGROUND

In most fields of image applications, a high-resolution image may be obtained by using a super-resolution algorithm, where the super-resolution algorithm refers to fusing multiple frames of low-resolution images, to generate one frame of high-resolution image. However, because a time difference exists when the multiple frames of low-resolution images are being captured, a local-motion difference exists between the multiple frames of images captured at difference times. The local motion is caused by a motion of an object in a scene at a time interval of capturing two frames of images.

Figure 1:
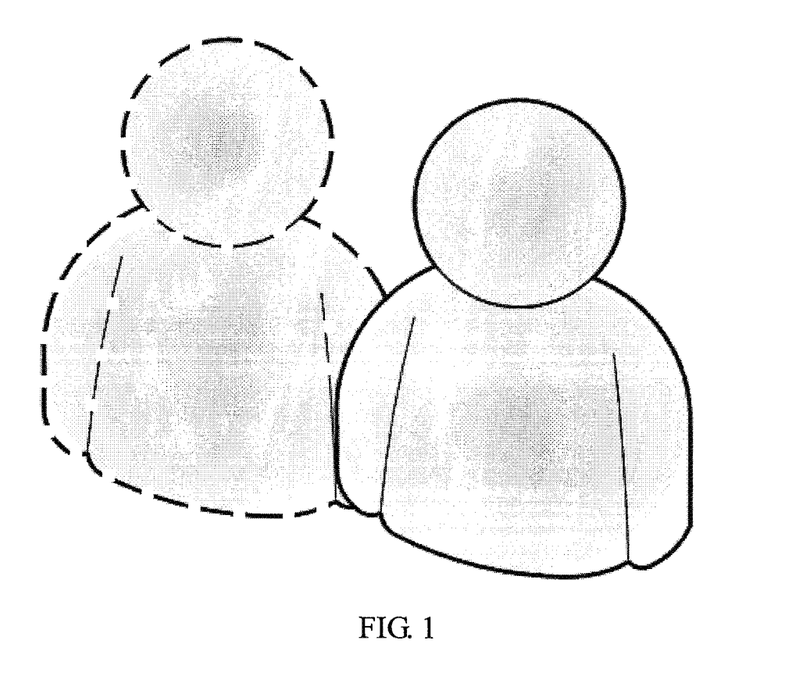
FIG. 1 is a schematic diagram of a "ghost" problem that exists when two low-resolution images are being fused to generate a high-resolution image according to the prior art.

Because the object in the scene moves at the time interval of capturing the two frames of images, a problem of a "ghost" is caused in a high-resolution image when the two frames of low-resolution images are being fused to generate the high-resolution image. As shown in FIG. 1, a "ghost" exists in a photograph generated by means of fusion.

SUMMARY

Embodiments of the present invention provide an image processing method and apparatus, and a terminal, to resolve a technical problem in the prior art that a "ghost image" exists when multiple frames of low-resolution images are being fused to generate a high-resolution image.

According to a first aspect of the embodiments of the present invention, an image processing method is provided and is applied to a terminal that includes a first camera lens and a second camera lens, the first camera lens and the second camera lens are located on a same side of the terminal, and the method includes: acquiring a first image that is captured by the first camera lens and is about a first area, and a second image that is captured at a same moment by the second camera lens and is about a second area; performing translation compensation on the second image by using the first image as a reference image; and fusing the first image and the second image that is obtained after translation compensation is performed, to generate a third image, where a resolution of the third image is higher than a resolution of the first image and a resolution of the second image.

With reference to the first aspect, in a first possible implementation manner, the performing translation compensation on the second image by using the first image as a reference image specifically includes: determining a translation vector between the first image and the second image; and performing, according to the translation vector, translation compensation on the second image captured by the second camera lens.

With reference to the first possible implementation manner of the first aspect, in a second possible implementation manner, the translation vector is determined by using the following formula: $d=B*f/Z$; where d indicates a translation vector of an object in the second image relative to the first image, where a distance between the object and a plane on which the first camera lens and the second camera lens are located is Z; B indicates a distance between the first camera lens and the second camera lens; and Z indicates a vertical distance between the object and the plane on which the first camera lens and the second camera lens are located, and f indicates a focal length of the first camera lens or a focal length of the second camera lens.

With reference to the first possible implementation manner of the first aspect, in a third possible implementation manner, the fusing the first image and the second image that is obtained after translation compensation is performed, to generate a third image specifically includes: determining a common area of the first image and the second image according to a result of the translation compensation; and fusing the common area of the first image and the second image to generate the third image.

According to a second aspect of the embodiments of the present invention, an image processing apparatus is provided, including: an acquiring module, configured to acquire a first image that is captured by a first camera lens and is about a first area, and a second image that is captured at a same moment by a second camera lens and is about a second area, where the first camera lens and the second camera lens are located on a same plane of the image processing apparatus; a translation compensating module, connected to the acquiring module and configured to: after the acquiring module obtains the first image and the second image, perform translation compensation on the second image by using the first image as a reference image; and an image fusion module, connected to the translation compensating module and configured to: after the translation compensating module performs translation compensation on the second image, fuse the first image and the second image that is obtained after translation compensation is performed, to generate a third image, where a resolution of the third image is higher than a resolution of the first image and a resolution of the second image.

With reference to the second aspect, in a first possible implementation manner, the translation compensating module specifically includes: a determining unit, configured to determine a translation vector between the first image and the second image; and a compensating unit, connected to the determining unit and configured to: after the determining unit determines the translation vector, perform, according to the translation vector, translation compensation on the second image captured by the second camera lens.

With reference to the first possible implementation manner of the second aspect, in a second possible implementation manner, the determining unit is specifically configured to determine the translation vector by using the following formula: $d=B*f/Z$; where d indicates a translation vector of an object in the second image relative to the first image, where a distance between the object and a plane on which the first camera lens and the second camera lens are located is Z; B indicates a distance between the first camera lens and the second camera lens; and Z indicates a vertical distance between the object and the plane on which the first camera lens and the second camera lens are located, and f indicates a focal length of the first camera lens or a focal length of the second camera lens.

With reference to the first possible implementation manner of the second aspect, in a third possible implementation manner, the image fusion module specifically includes: a determining unit, configured to determine a common area of the first image and the second image according to a result of the translation compensation; and a fusing unit, connected to the determining unit and configured to: after the determining unit determines the common area, fuse the common area of the first image and the second image to generate the third image.

According to a third aspect of the embodiments of the present invention, a terminal is provided, including: a first camera lens, configured to capture a first area to obtain a first image; a second camera lens, configured to capture a second area at a same moment when the first camera lens captures the first image, to obtain a second image, where the first camera lens and the second camera lens are located on a same side of the terminal; and a processor, connected to the first camera lens and the second camera lens, and configured to perform translation compensation on the second image by using the first image as a reference image; and fuse the first image and the second image that is obtained after translation compensation is performed, to generate a third image, where a resolution of the third image is higher than a resolution of the first image and a resolution of the second image.

With reference to the third aspect, in a first possible implementation manner, an optical axis of the first camera lens is parallel to an optical axis of the second camera lens, and/or the first camera lens and the second camera lens are disposed on the terminal in a fixed manner.

With reference to the third aspect, in a second possible implementation manner, that the processor performs translation compensation on the second image by using the first image as a reference image specifically includes: determining a translation vector between the first image and the second image; and performing, according to the translation vector, translation compensation on the second image captured by the second camera lens.

With reference to the second possible implementation manner of the third aspect, in a third possible implementation manner, that the processor determines a translation vector between the first image and the second image is specifically: determining the translation vector by using the following formula: $d=B*f/Z$; where d indicates a translation vector of an object in the second image relative to the first image, where a distance between the object and a plane on which the first camera lens and the second camera lens are located is Z; B indicates a distance between the first camera lens and the second camera lens; and Z indicates a vertical distance between the object and the plane on which the first camera lens and the second camera lens are located, and f indicates a focal length of the first camera lens or a focal length of the second camera lens.

With reference to the second possible implementation manner of the third aspect, in a fourth possible implementation manner, that the processor fuses the first image and the second image that is obtained after translation compensation is performed, to generate a third image specifically includes: determining a common area of the first image and the second image according to a result of the translation compensation; and fusing the common area of the first image and the second image to generate the third image.

Beneficial effects of the present invention are as follows:
In the embodiments of the present invention, a first image is obtained by capturing a first area by a first camera lens and a second image is obtained by capturing a second area by a second camera lens at a same moment, then translation compensation is performed on the second image by using the first image as a reference image, and finally the first image and the second image are fused to generate a third image, where a resolution of the third image is higher than a resolution of the first image and a resolution of the second image. Because the first image and the second image are images captured at the same moment, there is no object motion between the two frames of images; and translation compensation is performed on the second image by using the first image as a reference image, so that a position of a same object in the second image overlaps a position of a same object in the first image. In addition, because the first image and the second image are simultaneously capture, directions of hand trembling of a user are the same when the first image and the second image are being acquired. Therefore, a "ghost" generated because of hand trembling of the user can be avoided, and a problem of a "ghost" generated when multiple frames of low-resolution images are being fused to generate a high-resolution image is resolved.

Further, because the first image and the second image are captured at the same moment, time spent to capture the first image and the second image can be reduced; and when the third image is being generated by means of fusion, an algorithm is not required to correct a local motion and the problem of a "ghost" that is caused by hand trembling of the user. As a result, a speed of acquiring the third image is increased and user experience can be improved.

DETAILED DESCRIPTION

To resolve a technical problem of a "ghost" that exists when multiple frames of images are being fused to generate an image in the prior art, embodiments of the present invention provide an image processing method. The method is applied to a terminal that includes a first camera lens and a second camera lens, where the first camera lens and the second camera lens are located on a same side of the terminal. The method includes: acquiring a first image that is captured by the first camera lens and is about a first area, and a second image that is captured at a same moment by the second camera lens and is about a second area; performing translation compensation on the second image by using the first image as a reference image; and fusing the first image and the second image that is obtained after translation compensation is performed, to generate a third image, where a resolution of the third image is higher than a resolution of the first image and a resolution of the second image.

Because the first image and the second image are images captured at the same moment, there is no object motion between the two frames of images; and translation compensation is performed on the second image by using the first image as a reference image, so that a position of a same object in the second image overlaps a position of a same object in the first image. In addition, because the first image and the second image are simultaneously captured, directions of hand trembling of a user are the same when the first image and the second image are being acquired. Therefore, a "ghost" generated because of hand trembling of the user can be avoided, and a problem of a "ghost" generated when multiple frames of low-resolution images are being fused to generate a high-resolution image is resolved.

Further, because the first image and the second image are captured at the same moment, time spent to capture the first image and the second image can be reduced; and when the third image is being generated by means of fusion, an algorithm is not required to correct a local motion and the problem of a "ghost" that is caused by hand trembling of the user. As a result, a speed of acquiring the third image is increased and user experience can be improved.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 2:
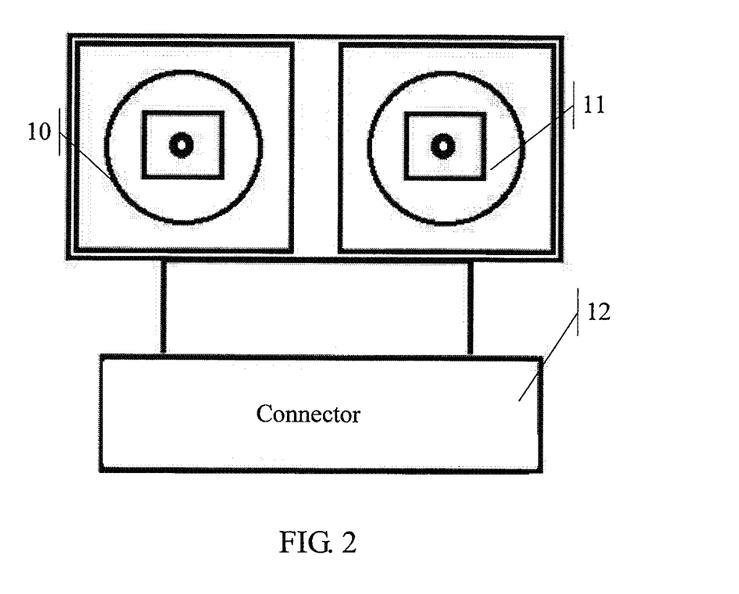
FIG. 2 is a schematic diagram in which a first camera lens and a second camera lens are disposed on a same side of a terminal in an image processing method according to an embodiment of the present invention.

According to a first aspect, an embodiment of the present invention provides an image processing method. Referring to FIG. 2, the method is applied to a terminal that includes a first camera lens 10 and a second camera lens 11, the first camera lens 10 and the second camera lens 11 are located on a same side of the terminal, and the first camera lens 10 may be connected to the second camera lens 11 by using a connector 12.

Figure 3:
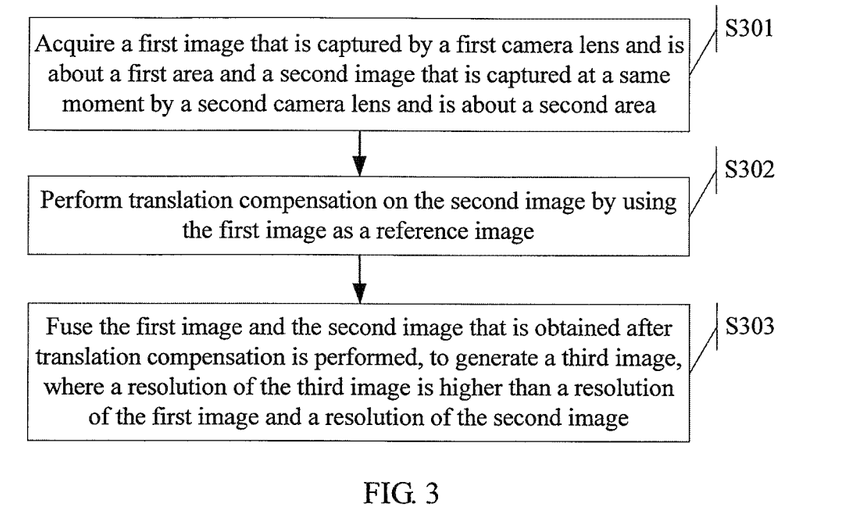
FIG. 3 is a flowchart of an image processing method according to an embodiment of the present invention.

Referring to FIG. 3, the method specifically includes the following steps:

Step S301: Acquire a first image that is captured by the first camera lens 10 and is about a first area, and a second image that is captured at a same moment by the second camera lens 11 and is about a second area, where each of the first image and the second image is one frame of image.

It may be understood that, the acquiring a first image that is captured by the first camera lens 10 and is about a first area, and a second image that is captured at a same moment by the second camera lens 11 and is about a second area may be acquiring a first image previewed when the first camera lens 10 photographs the first area and a second image previewed when the second camera lens 11 photographs the second area at a same moment; or may be acquiring a first image obtained by photographing the first area by the first camera lens 10 and a second image obtained by photographing the second area by the second camera lens 11 at a same moment.

A focal length of the first camera lens 10 and a focal length of the second camera lens 11 may be the same.

Step S302: Perform translation compensation on the second image by using the first image as a reference image.

Step S303: Fuse the first image and the second image that is obtained after translation compensation is performed, to generate a third image, where a resolution of the third image is higher than a resolution of the first image and a resolution of the second image.

In step S301, the first camera lens 10 and the second camera lens 11 may be entirely separate camera lenses, and the first camera lens 10 and the second camera lens 11 may be controlled by using software to simultaneously perform capture; therefore, an object in the second image is absolutely still relative to an object in the first image. For example, in a scenario, a user A is in a motion state, and in the prior art, if images are captured at different times, a position of the user A in the first image is different from a position of the user A in the second image, and therefore, a "ghost" is formed after the third image is generated by means of fusion. However, in the present invention, although the user A is in motion, the user A is in a same position in the first image and in the second image after translation compensation is performed, which avoids a problem of a "ghost" caused by an object motion between the two frames of images.

During a specific implementation process, the first camera lens 10 and the second camera lens 11 may be disposed in multiple manners, and three relatively preferable disposing manners are listed in the following. Certainly, during a specific implementation process, disposing manners are not limited to the following three cases:

The first case is that an optical axis of the first camera lens 10 is parallel to an optical axis of the second camera lens 11.

For example, an optical axis refers to a vertical direction of a plane on which a lens of a camera lens is located, that is, a symmetry axis in an optical system. That an optical axis of the first camera lens 10 is parallel to an optical axis of the second camera lens 11 refers to that a vertical line of a plane on which a lens of the first camera lens 10 is located is parallel to a vertical line of a plane on which a lens of the second camera lens 11 is located. If the optical axis of the first camera lens 10 is parallel to the optical axis of the second camera lens 11, problems such as distortion and shielding can be avoided in the first image and the second image, so that a calculated translation vector is more accurate.

The second case is that the first camera lens 10 and the second camera lens 11 are disposed on a terminal in a fixed manner.

In this case, even if the terminal are being dropped, squeezed, or the like during a process of using the terminal by a user, unchanged relative positions and postures of the first camera lens 10 and the second camera lens 11 can be ensured. In this case, when a user's hand trembles, a difference in trembling directions between the first camera lens 10 and the second camera lens 11 can be avoided, so that a problem of a "ghost" caused by hand trembling of the user can be further avoided.

A third case is that an optical axis of the first camera lens 10 is parallel to an optical axis of the second camera lens 11, and the first camera lens 10 and the second camera lens 11 are disposed on a terminal in a fixed manner.

In this case, because changes of relative positions and postures of the first camera lens 10 and the second camera lens 11 can be avoided, that optical axes of the first camera lens 10 and the second camera lens 11 are not parallel resulting from the changes of the relative positions and the postures of the first camera lens 10 and the second camera lens 11 can be further avoided. As a result, a calculated translation vector of the second image relative to the first image is more accurate, and a problem of a "ghost" can be further avoided.

Figure 4:
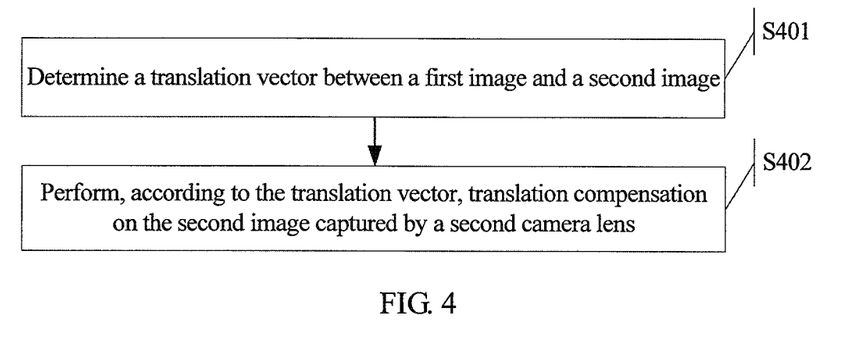
FIG. 4 is a flowchart in which translation compensation is performed on a second image in an image processing method according to an embodiment of the present invention.

As shown in FIG. 4, the performing translation compensation on the second image by using the first image as a reference image in step S302 further specifically includes the following steps:

Step S401: Determine a translation vector between the first image and the second image.

Step S402: Perform, according to the translation vector, translation compensation on the second image captured by the second camera lens 11.

Optionally, in step S401, the translation vector between the first image and the second image may be determined by using the following formula:

$d = B \cdot f / Z$; where d indicates a translation vector of an object in the second image relative to the first image, where a distance between the object and a plane on which the first camera lens 10 and the second camera lens 11 are located is Z;

B indicates a distance between the first camera lens 10 and the second camera lens 11; and Z indicates a vertical distance between the object and the plane on which the first camera lens 10 and the second camera lens 11 are located, that is, a depth of the object, and f indicates a focal length of the first camera lens 10 or a focal length of the second camera lens 11.

Figure 5:
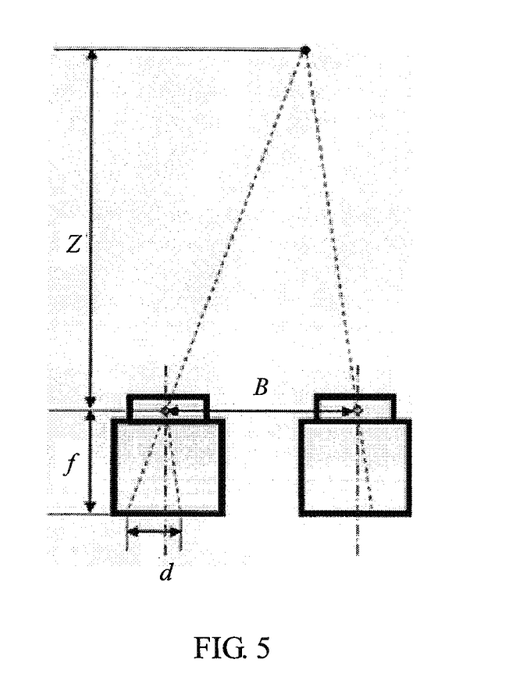
FIG. 5 is a schematic diagram of a position relationship among d, B, f, and Z in a translation vector calculation formula in an image processing method according to an embodiment of the present invention.

As shown in FIG. 5, FIG. 5 is a schematic diagram of a position relationship among d, B, f, and Z. After the first image is obtained by the first camera lens 10 by means of capture and the second image is obtained by the second camera lens 11 by means of capture, a depth generated by the first camera lens 10 and the second camera lens 11 may be obtained, and translation vectors of different objects is then determined by using the foregoing translation vector calculation formula.

Further, the depth generated by the first camera lens 10 and the second camera lens 11 and a translation vector corresponding to the depth may also be pre-calibrated by using the foregoing translation vector calculation formula, and a calibration method may be as follows:

N groups of specific images (for example, checkerboard images) are captured in N different discrete depth levels, and each group includes two images, where the two images are respectively from the first camera lens 10 and the second camera lens 11, and then a translation vector between images in each group is calibrated. In this way, N groups of translation vectors are obtained, and the N groups of translation vectors are calibrated translation vectors between pixels in N depths. The N depths and the corresponding N translation vectors may be prestored in a rom for usage during actual photographing.

If the translation vector is pre-calibrated in the foregoing manner, a process of determining the translation vector between the first image and the second image is as follows:

The translation vector corresponding to the depth is queried in the rom according to incoming depth information of a captured scenario, where the translation vector is a translation vector of the second image relative to the first image in the depth (it is assumed that the first image is a reference image). For example, if a depth of a pixel A in the scenario is D, and a translation vector, queried in the rom, corresponding to D is M, a translation vector of the pixel A in the second image relative to the pixel A in the first image is M.

In this case, when the third image is being generated, a speed of acquiring the third image is further improved because the translation vector does not need to be obtained through calculation again.

In addition, because translation vectors of same-depth objects in the second image relative to the first image are the same in the scenario, calibration may be performed on each product at delivery, so that precision of the determined translation vector is higher.

The performing, according to the translation vector, translation compensation on the second image captured by the second camera lens 11 in step S402 is, for example, keeping the first image unchanged, and subtracting a translation vector corresponding to a depth corresponding to each pixel from coordinates of each pixel of the second image. In this way, the second image obtained after translation compensation is performed can be obtained.

Figure 6:
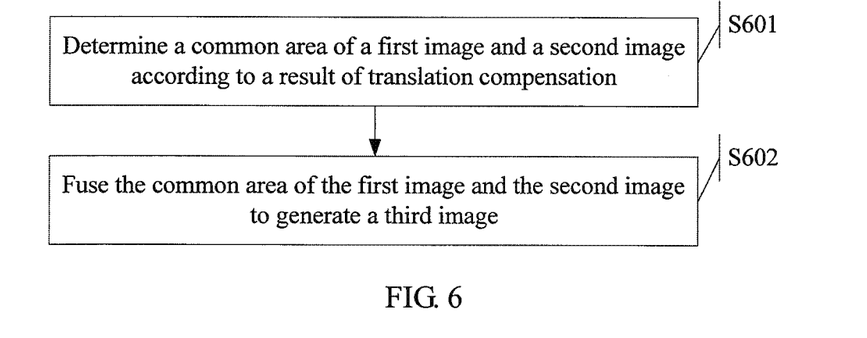
FIG. 6 is a flowchart in which fusion is performed on a first image and a second image that is obtained after translation compensation is performed in an image processing method according to an embodiment of the present invention.

Referring to FIG. 6, the fusing the first image and the second image that is obtained after translation compensation is performed, to generate a third image in step S303 specifically includes the following steps:

Step S601: Determine a common area of the first image and the second image according to a result of the translation compensation.

Step S602: Fuse the common area of the first image and the second image to generate the third image.

Figure 7A:
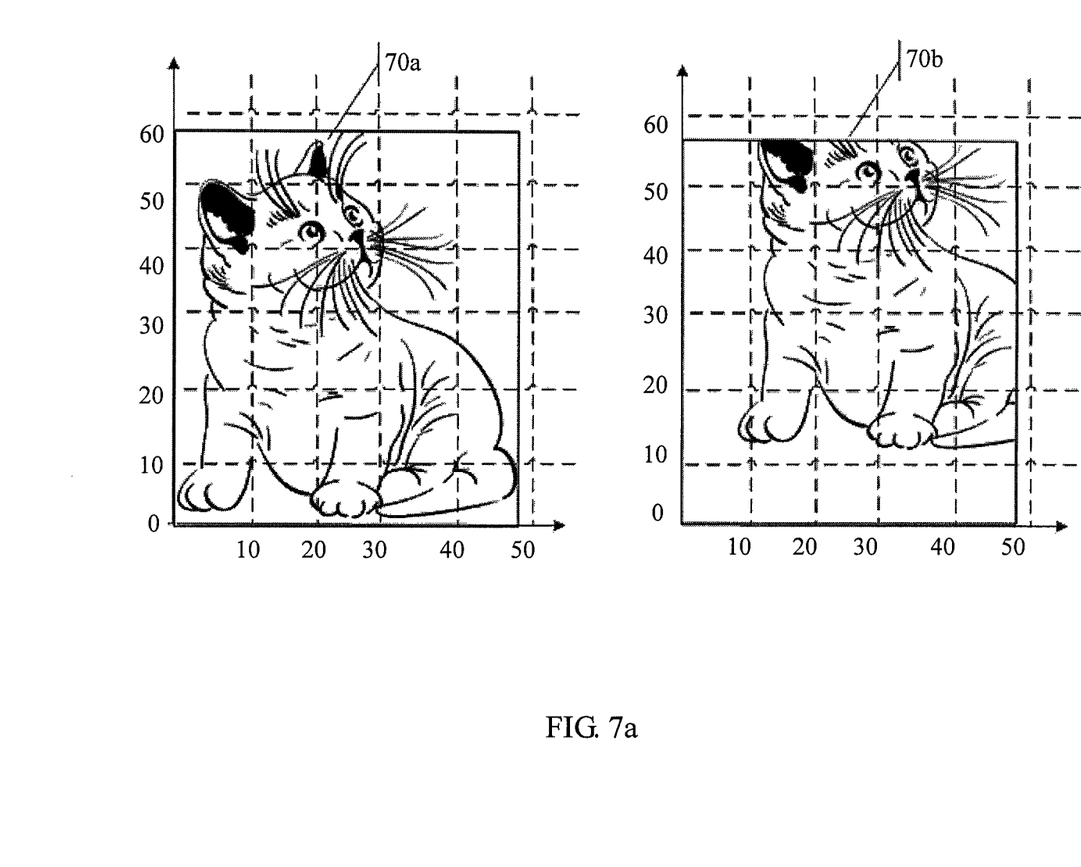
FIG. 7a is a schematic diagram of a first image and a second image that are obtained by means of capture in an image capture method according to an embodiment of the present invention.
Figure 7B:
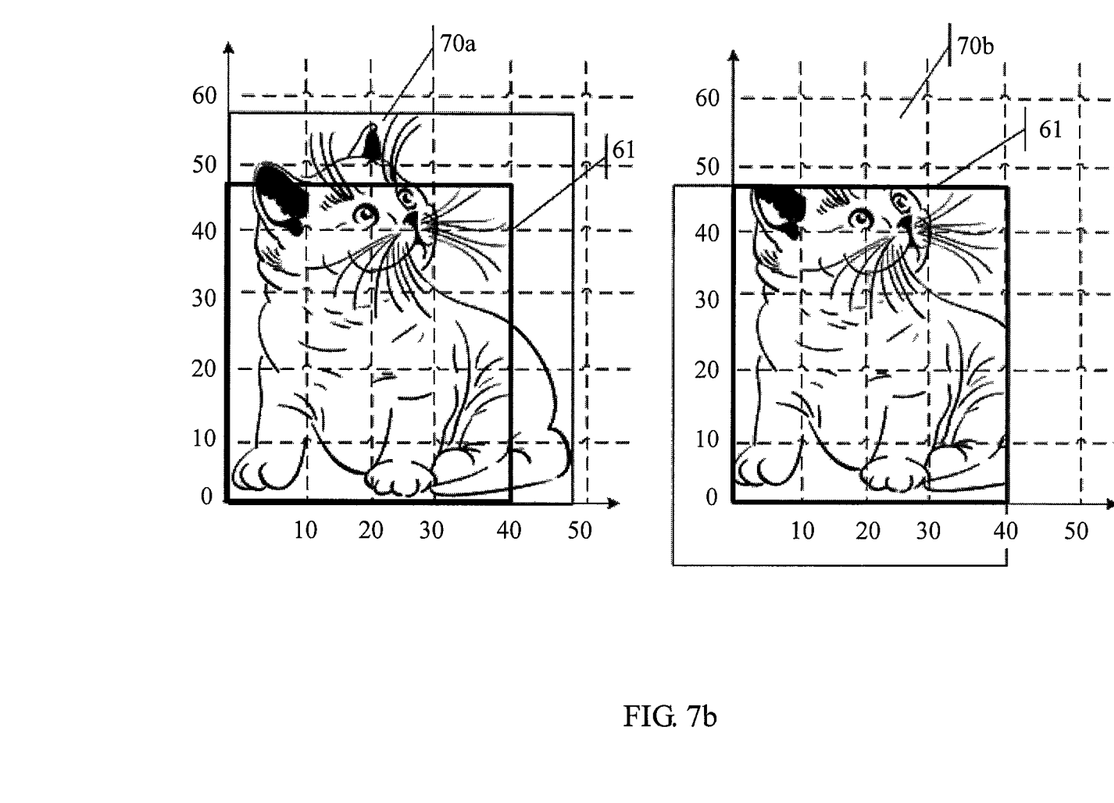
FIG. 7b is a schematic diagram of a common area that is of a first image and a second image and that is determined after translation compensation is performed on the second image in an image processing method according to an embodiment of the present invention.

In step S601, referring to FIG. 7a, a first image 70a and a second image 70b are obtained by means of capture, a translation vector corresponding to a depth of each pixel in the second image 70b may be determined first, and then the translation vector corresponding to the depth corresponding to each pixel is subtracted from each pixel in the second image 70b, so that the second image 70b obtained after translation compensation is performed can be obtained. As shown in FIG. 7b, in this case, content of a common part of the first image 70a and the second image 70b are used as a common area 71.

In step S602, there are multiple manners in which the common area of the first image 70a and the second image 70b is fused to generate the third image, and the following lists two manners of fusion for description. Certainly, during a specific implementation process, manners of fusion are not limited to the following two cases:

(1) Fusing the first image 70a and the second image 70b that is obtained after translation compensation is performed, to generate the third image is specifically: tailoring a common area 71 from the first image 70a and the second image 70b, and fusing the tailored common area 71 of the first image 70a and the second image 70b to generate the third image.

After translation compensation is performed on the second image 70b, because a same object is in a same position in the second image 70b and the first image 70a, an area in which same coordinates are located, in the first image 70a and the second image 70b, may be directly determined as the common area 71.

In this case, only the common area 61 of the first image 70a and the second image 70b needs to be fused, and another area does not need to be processed; therefore, a processing speed of the terminal can be improved and processing burden of the terminal can be reduced.

Figure 7C:
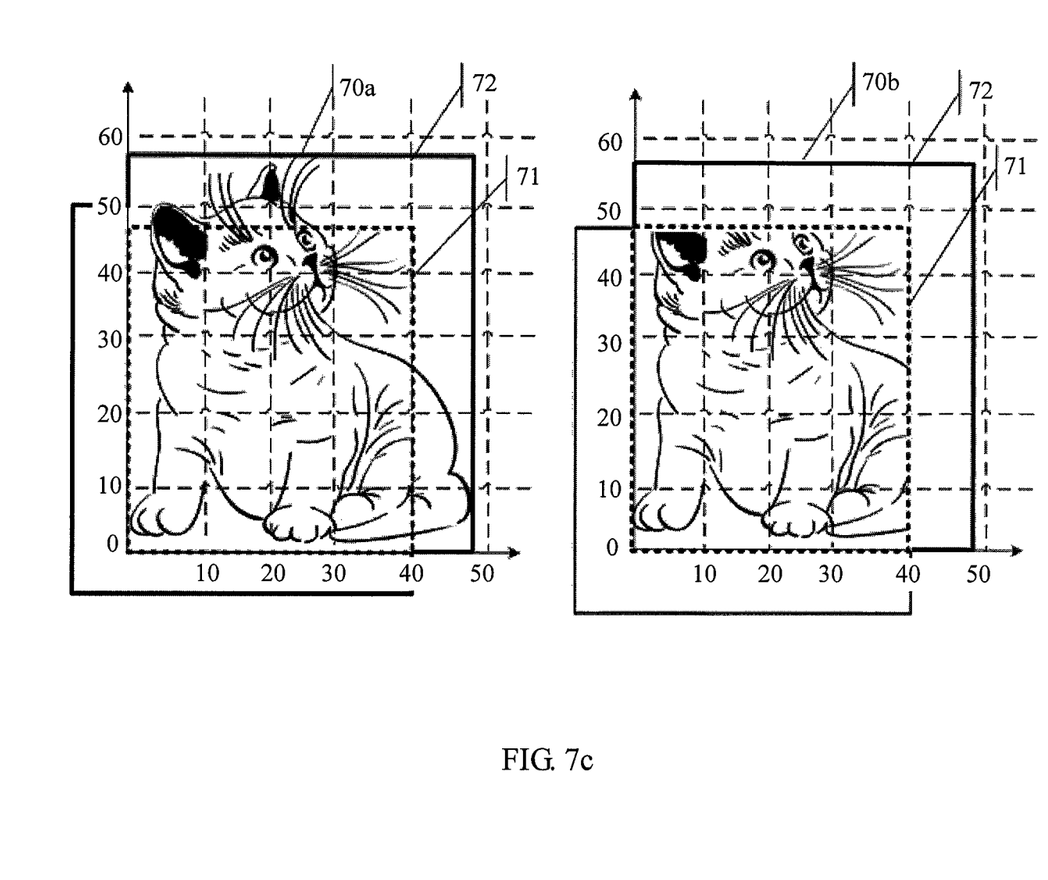
FIG. 7c is a schematic diagram of a combined area and a common area that are of the first image and the second image and that are determined in an image processing method according to an embodiment of the present invention.

(2) Fusing the common area of the first image and the second image to generate the third image is specifically: determining a combined area 72 of the first image 70a and the second image 70b (that is, a union set of areas of the first image 70a and the second image 70b), as shown in FIG. 7c; and fusing the combined area 72 of the first image 70a and the second image 70b, and finally tailoring the common area 71 of the first image 70a and the second image 70b from a fusion result and using the common area 71 as the third image.

After translation compensation is performed on the second image 70b, because a same object is in a same position in the second image 70b and the first image 70a, an area in which same coordinates are located, in the first image 70a and the second image 70b may be determined as the common area 71, and the common area 71 may be stored; a largest area included in an area that is determined by coordinates in the first image 70a and the second image 70b is used as the combined area.

During a specific implementation process, in step S303, the first image 70a and the second image 70b that is obtained after translation compensation is performed may be fused to generate the third image by using an interpolation method, for example, a kernel regression interpolation method or an edge-based kernel regression interpolation method, which is not limited in this embodiment of the present invention.

In the foregoing solution, when the first image and the second image that is obtained after translation compensation is performed are being fused to generate the third image, the common area of the first image and the second image needs to be determined first; when a high-resolution image is being generated by means of fusion, a high-resolution effect can be achieved only if the common area of the first image and the second image are fused, but a resolution of a non-common area cannot be improved in an image fusion manner; therefore, in this case, the third image generated by means of fusion is more accurate.

The following describes an image processing method in the present invention with reference to several specific embodiments, and the following embodiments mainly describe several possible implementation manners of the image processing method. It should be noted that, the embodiments in the present invention are only used to explain the present invention, but cannot be used to limit the present invention. All embodiments that comply with the idea of the present invention are within the protection scope of the present invention, and a person skilled in the art should know how to develop other implementation manners based on the idea of the present invention.

Figure 8:
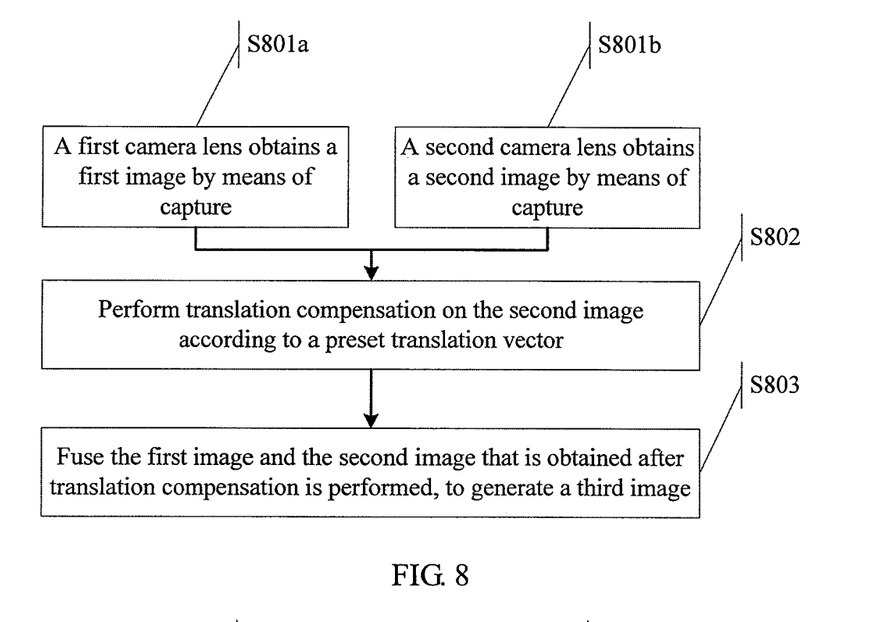
FIG. 8 is a flowchart of an image processing method according to Embodiment 1 of the present invention.

Embodiment 1 of the present invention is described by using an example in which the terminal is a mobile phone, where the mobile phone includes two camera lenses, the two camera lenses are located on a same side of the mobile phone, optical axes of the two camera lenses are parallel, and the two camera lenses are disposed on the mobile phone in a fixed manner. Referring to FIG. 8, FIG. 8 is a flowchart of an image processing method according to Embodiment 1 of the present invention.

Step S801a: A first camera lens 10 obtains a first image by means of capture, where a resolution of the first image is 3264 px*2448 px.

Step S801b: At a same moment when the first camera lens 10 obtains the first image by means of capture, a second camera lens 11 obtains a second image by means of capture, where a resolution of the second image is 3264 px*2448 px.

Step S802: Perform translation compensation on the first image and the second image according to depth information of a scenario and a prestored correspondence between a depth and a translation vector.

Specifically, the first camera lens 10 may transfer the first image to a translation compensating module of the mobile phone, the second camera lens 11 transfers the second image to the translation compensating module of the mobile phone, and then the translation compensating module then performs translation compensation on the first image and the second image. A specific step thereof is as follows: A translation vector corresponding to a pixel of each depth is determined from the prestored correspondence between the depth and the translation vector in the mobile phone according to the depth information of the scenario; a translation vector corresponding to a depth corresponding to each pixel is then subtracted from coordinates of each pixel of the second image, to obtain the second image that is obtained after translation compensation is performed; and a common area of the first image and the second image that is obtained after translation compensation is performed is finally determined.

Step S803: After a common area of the first image and the second image that is obtained after translation compensation is performed is determined, fuse the first image and the second image that is obtained after translation compensation is performed.

Specifically, after the common area of the first image and the second image that is obtained after translation compensation is performed is determined, the first image, the second image that is obtained after translation compensation is performed, and coordinate information corresponding to the common area are transferred to an image fusion module of the mobile phone; the common area of the first image and the second image that is obtained after translation compensation is performed is tailored by using the image fusion module; and a tailored first image and a tailored second image are finally fused into a high-resolution image by using an interpolation algorithm, that is, a third image, where a resolution of the third image is, for example, 4160 px*3120 px. In this embodiment, resolution sizes of the listed first image, second image, and third image are merely an example, which is not construed as a limitation.

Figure 9:
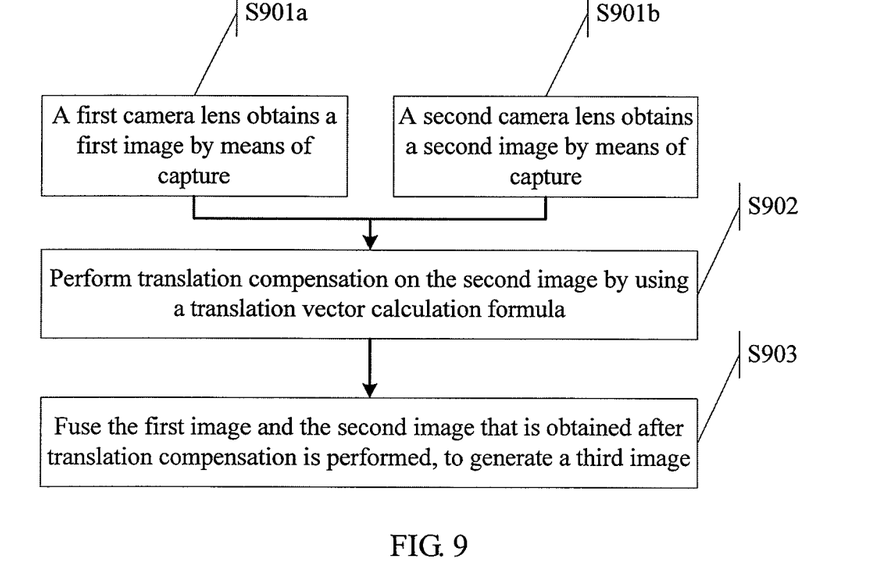
FIG. 9 is a flowchart of an image processing method according to Embodiment 2 of the present invention.

An embodiment is described by using an example in which the terminal is a tablet computer, where the tablet computer includes a first camera lens 10 and a second camera lens 11, and the first camera lens 10 and the second camera lens 11 are located on a same side of the tablet computer. Referring to FIG. 9, the image processing method includes the following steps:

Step S901a: The first camera lens 10 obtains a first image by means of capture.

Step S901b: At a same moment when the first camera lens 10 obtains the first image by means of capture, the second camera lens 11 obtains a second image by means of capture.

Step S902: The first camera lens 10 and the second camera lens 11 respectively transfer the first image and the second image to a translation compensating module of a mobile phone, and then the translation compensating module performs translation compensation on the first image and the second image. A specific step thereof is as follows: The translation compensating module divides the first image into N areas according to depth information of a captured scenario, and then calculates a translation vector of each area according to a formula $d=B*f/Z$.

Step S903: After a common area of the first image and the second image that is obtained after translation compensation is performed is determined, transfer the first image, the second image that is obtained after translation compensation is performed, and coordinate information of the common area to an image fusion module of the mobile phone, determine a combined area of the first image and the second image by using the image fusion module, fuse the combined area of the first image and the second image to generate a high-resolution image, and finally tailor the common area of the first image and the second image from this high-resolution image to obtain a third image.

Figure 10:
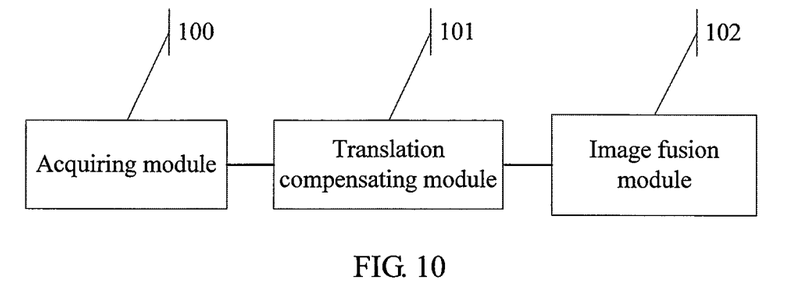
FIG. 10 is a structural diagram of an image capture apparatus according to an embodiment of the present invention.

According to a second aspect, an embodiment of the present invention provides an image processing apparatus. Referring to FIG. 10, the apparatus specifically includes the following structure:

an acquiring module 100, configured to acquire a first image that is captured by a first camera lens 10 and is about a first area, and a second image that is captured at a same moment by a second camera lens 11 and is about a second area, where the first camera lens 10 and the second camera lens 11 are located on a same plane of the image processing apparatus;

a translation compensating module 101, connected to the acquiring module 100 and configured to: after the acquiring module 100 obtains the first image and the second image, perform translation compensation on the second image by using the first image as a reference image; and an image fusion module 102, connected to the translation compensating module 101 and configured to: after the translation compensating module 91 performs translation compensation on the second image, fuse the first image and the second image that is obtained after translation compensation is performed, to generate a third image, where a resolution of the third image is higher than a resolution of the first image and a resolution of the second image.

Optionally, an optical axis of the first camera lens 10 is parallel to an optical axis of the second camera lens 11, and/or the first camera lens 10 and the second camera lens 11 are disposed on a terminal in a fixed manner.

Optionally, the translation compensating module 101 specifically includes:

a determining unit, configured to determine a translation vector between the first image and the second image; and a compensating unit, connected to the determining unit and configured to: after the determining unit determines the translation vector, perform, according to the translation vector, translation compensation on the second image captured by the second camera lens 11.

Optionally, the determining unit is specifically configured to determine the translation vector by using the following formula:

$$d=B*f/Z;\text{ where}$$

d indicates a translation vector of an object in the second image relative to the first image, where a distance between the object and a plane on which the first camera lens 10 and the second camera lens 11 are located is Z;

B indicates a distance between the first camera lens 10 and the second camera lens 11; and Z indicates a vertical distance between the object and the plane on which the first camera lens 10 and the second camera lens 11 are located, and f indicates a focal length of the first camera lens or a focal length of the second camera lens.

Optionally, the image fusion module 102 specifically includes:

a determining unit, configured to determine a common area of the first image and the second image according to a result of the translation compensation; and a fusing unit, connected to the determining unit and configured to: after the determining unit determines the common area, fuse the common area of the first image and the second image to generate the third image.

Because the image processing apparatus described in this embodiment of the present invention is the image processing apparatus used to implement the image processing method in the embodiments of the present invention, based on the image processing method described in the embodiments of the present invention, a person skilled in the art can understand a specific structure and variations of the image processing apparatus described in this embodiment of the present invention, and details are not described herein again.

Figure 11:
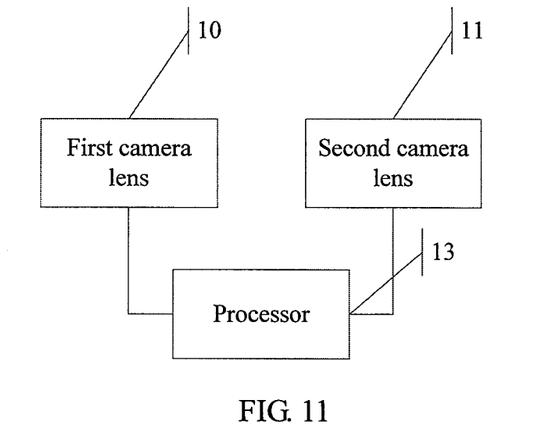
FIG. 11 is a structural diagram of a terminal according to an embodiment of the present invention.

According to a third aspect, an embodiment of the present invention provides a terminal, where the terminal is, for example, a mobile phone, a tablet computer, or a digital camera. Referring to FIG. 11, the terminal includes:

a first camera lens 10, configured to capture a first area to obtain a first image;

a second camera lens 11, configured to capture a second area at a same moment when the first camera lens 10 captures the first image, to obtain a second image, where the first camera lens 10 and the second camera lens 11 are located on a same side of the terminal; and a processor 13, connected to the first camera lens 10 and the second camera lens 11, and configured to perform translation compensation on the second image by using the first image as a reference image; and fuse the first image and the second image that is obtained after translation compensation is performed, to generate a third image, where a resolution of the third image is higher than a resolution of the first image and a resolution of the second image.

The first camera lens 10 may be connected to the second camera lens 11 by using a connector 12 (as shown in FIG. 2).

Optionally, an optical axis of the first camera lens 10 is parallel to an optical axis of the second camera lens 11, and/or the first camera lens 10 and the second camera lens 11 are disposed on the terminal in a fixed manner.

Optionally, that the processor 13 performs translation compensation on the second image by using the first image as a reference image specifically includes:

determining a translation vector between the first image and the second image; and performing, according to the translation vector, translation compensation on the second image captured by the second camera lens 11.

Optionally, that the processor 13 determines a translation vector between the first image and the second image is specifically:

determining the translation vector by using the following formula:

$$d=B*f/Z;\text{ where}$$

d indicates a translation vector of an object in the second image relative to the first image, where a distance between the object and a plane on which the first camera lens 10 and the second camera lens 11 are located is Z;

B indicates a distance between the first camera lens 10 and the second camera lens 11; and Z indicates a vertical distance between the object and the plane on which the first camera lens 10 and the second camera lens 11 are located, and f indicates a focal length of the first camera lens or a focal length of the second camera lens.

The focal length of the first camera lens may be the same as the focal length of the second camera lens.

Optionally, that the processor 13 fuses the first image and the second image that is obtained after translation compensation is performed, to generate a third image specifically includes:

determining a common area of the first image and the second image according to a result of the translation compensation; and fusing the common area of the first image and the second image to generate the third image.

It may be understood that, that the first camera lens and the second camera lens are located on a same side of the terminal may be that the first camera lens and the second camera lens are located on a rear face of the terminal, where pixels of the first camera lens and the second camera lens may be the same or may be different. Certainly, the first camera lens and the second camera lens may also be located on a front face of the terminal. The terminal may be a mobile phone, a tablet computer, a wearable device, a wrist strap device, a digital camera, glasses, or the like.

Because the terminal described in this embodiment of the present invention is the terminal used to implement the image processing method in the embodiments of the present invention, based on the image processing method described in the embodiments of the present invention, a person skilled in the art can understand a specific structure and variations of the terminal described in this embodiment of the present invention, and details are not described herein again.

One or more technical solutions provided in this application have at least the following technical effects or advantages:

(1) In this embodiment of the present invention, a first image is obtained by capturing a first area by a first camera lens and a second image is obtained by capturing a second area by a second camera lens at a same moment, translation compensation is performed on the second image by using the first image as a reference image, and finally the first image and the second image are fused to generate a third image, where a resolution of the third image is higher than a resolution of the first image and a resolution of the second image. Because the first image and the second image are images captured at the same moment, there is no object motion between the two frames of images; and translation compensation is performed on the second image by using the first image as a reference image, so that a position of a same object in the second image overlaps a position of a same object in the first image overlap. In addition, because the first image and the second image are simultaneously captured, directions of hand trembling of a user are the same when the first image and the second image are being acquired. Therefore, a "ghost" generated because of hand trembling of the user can be avoided, and a problem of a "ghost" generated when multiple frames of low-resolution images are being fused to generate a high-resolution image is resolved.

Further, because the first image and the second image are captured at the same moment, time spent to capture the first image and the second image can be reduced; and when the third image is being generated by means of fusion, an algorithm is not required to correct a local motion and the problem of a "ghost" that is caused by hand trembling of the user. As a result, a speed of acquiring the third image is increased and user experience can be improved.

(2) In this embodiment of the present invention, because an optical axis of the first camera lens is parallel to an optical axis of the second camera lens, problems such as distortion and shielding can be avoided in the first image and the second image, so that a calculated translation vector is more accurate, and a problem of a "ghost" can be further avoided.

Because the first camera lens and the second camera lens are disposed in a fixed manner, changes of relative positions and postures of the first camera lens and the second camera lens can be avoided, thereby ensuring that translation vectors of same-depth objects in the second image relative to the first image are the same in a scenario. In this case, a correspondence between a depth and a translation vector may be prestored; and during photographing, a translation vector corresponding to an actual depth may be directly determined by using the actual depth of the scenario, and the translation vector does not need to be calculated after the two images are obtained by means of capture, thereby increasing a speed of obtaining the third image. In addition, when a user's hand trembles, a difference in trembling directions between the first camera lens and the second camera lens can be avoided, so that the problem of a "ghost" can be further avoided.

Because the optical axis of the first camera lens can be parallel to the optical axis of the second camera lens, and the first camera lens and the second camera lens can also be disposed on a terminal in a fixed manner, that optical axes are not parallel resulting from changes of the relative positions of the first camera lens and the second camera lens can be avoided, where unparallel optical axes may cause a prestored translation vector to be insufficiently accurate. As a result, more accurate translation compensation performed on the second image can be ensured, and the problem of a "ghost" can be further avoided.

(3) In this embodiment of the present invention, when the first image and the second image that is obtained after translation compensation is performed are being fused to generate the third image, a common area of the first image and the second image needs to be determined, and when a high-resolution image is being generated by means of fusion, a technical effect of acquiring a high-resolution image can be achieved only if the common area of the first image and the second image are fused, but a technical effect of improving a resolution of a non-common area cannot be achieved in an image fusion manner; therefore, in this case, the third image generated by means of fusion is more accurate.

(4) In this embodiment of the present invention, when the first image and the second image are being fused to generate the third image, fusion processing may be performed only on the common area of the first image and the second image, and processing does not need to be performed on another area; therefore, there are technical effects of improving a processing speed of the terminal and reducing processing burden of the terminal.

A person skilled in the art should understand that the embodiments of the present invention may be provided as a method, a system, or a computer program product. Therefore, the present invention may use a form of hardware only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

Obviously, a person skilled in the art can make various modifications and variations to the embodiments of the present invention without departing from the spirit and scope of the embodiments of the present invention. The present invention is intended to cover these modifications and variations provided that they fall within the scope defined by the following claims and their equivalent technologies.

What is claimed is:

1. An image processing method for use with a terminal having a first camera lens and a second camera lens, wherein the first camera lens and the second camera lens are located on a same side of the terminal, the method comprising:
    acquiring a first image captured by the first camera lens and is about a first area, and acquiring a second image captured at a same moment by the second camera lens and is about a second area;
    performing translation compensation on the second image by using the first image as a reference image; and
    fusing the first image and the second image that is obtained after translation compensation is performed, to generate a third image, wherein a resolution of the third image is higher than a resolution of the first image and a resolution of the second image;
    wherein performing translation compensation on the second image by using the first image as a reference image comprises:
        determining a translation vector between the first image and the second image, and
        performing, according to the translation vector, translation compensation on the second image captured by the second camera lens;
    wherein the translation vector is determined by using the following formula:

$d=B*f/Z$; wherein:

d indicates a translation vector of an object in the second image relative to the first image, wherein a distance between the object and a plane on which the first camera lens and the second camera lens are located is Z,
        B indicates a distance between the first camera lens and the second camera lens,
        Z indicates a vertical distance between the object and the plane on which the first camera lens and the second camera lens are located, and
        f indicates a focal length of the first camera lens or a focal length of the second camera lens.

2. The method according to claim 1, wherein fusing the first image and the second image that is obtained after translation compensation is performed, to generate a third image comprises:
    determining a common area of the first image and the second image according to a result of the translation compensation; and
    fusing the common area of the first image and the second image to generate the third image.

3. An image processing apparatus, comprising:
    an acquiring module, configured to acquire a first image captured by a first camera lens and is about a first area, and a second image captured at a same moment by a second camera lens and is about a second area, wherein the first camera lens and the second camera lens are located on a same plane of the image processing apparatus;
    a translation compensating module, connected to the acquiring module and configured to:
        after the acquiring module obtains the first image and the second image, perform translation compensation on the second image by using the first image as a reference image; and
    an image fusion module, connected to the translation compensating module and configured to:
        after the translation compensating module performs translation compensation on the second image, fuse the first image and the second image that is obtained after translation compensation is performed, to generate a third image, wherein a resolution of the third image is higher than a resolution of the first image and a resolution of the second image;
    wherein the translation compensating module comprises:
        a first determining unit, configured to determine a translation vector between the first image and the second image, and
        a compensating unit, connected to the first determining unit and configured to: after the first determining unit determines the translation vector, perform, according to the translation vector, translation compensation on the second image captured by the second camera lens;
    wherein the determining unit is configured to determine the translation vector by using the following formula:

$d=B*f/Z$; wherein:

d indicates a translation vector of an object in the second image relative to the first image, wherein a distance between the object and a plane on which the first camera lens and the second camera lens are located is Z,
        B indicates a distance between the first camera lens and the second camera lens,
        Z indicates a vertical distance between the object and the plane on which the first camera lens and the second camera lens are located, and
        f indicates a focal length of the first camera lens or a focal length of the second camera lens.

4. The apparatus according to claim 3, wherein the image fusion module comprises:
    a second determining unit, configured to determine a common area of the first image and the second image according to a result of the translation compensation; and
    a fusing unit, connected to the second determining unit and configured to: after the second determining unit determines the common area, fuse the common area of the first image and the second image to generate the third image.

5. A terminal, comprising:

a first camera lens, configured to capture a first area to obtain a first image;

a second camera lens, configured to capture a second area at a same moment when the first camera lens captures the first image, to obtain a second image, wherein the first camera lens and the second camera lens are located on a same side of the ten final; and a processor, connected to the first camera lens and the second camera lens, and configured to:

perform translation compensation on the second image by using the first image as a reference image, fuse the first image and the second image that is obtained after translation compensation is performed, to generate a third image, wherein a resolution of the third image is higher than a resolution of the first image and a resolution of the second image, determine a translation vector between the first image and the second image, and perform, according to the translation vector, translation compensation on the second image captured by the second camera lens;

wherein the processor is configured to determine the translation vector by using the following formula:

$d = B * f / Z$; wherein:

d indicates a translation vector of an object in the second image relative to the first image, wherein a distance between the object and a plane on which the first camera lens and the second camera lens are located is Z, B indicates a distance between the first camera lens and the second camera lens, Z indicates a vertical distance between the object and the plane on which the first camera lens and the second camera lens are located, and f indicates a focal length of the first camera lens or a focal length of the second camera lens.

6. The terminal according to claim 5, wherein:

an optical axis of the first camera lens is parallel to an optical axis of the second camera lens, and/or the first camera lens and the second camera lens are disposed on the terminal in a fixed manner.

7. The terminal according to claim 5, wherein the processor is further configured to:

determine a common area of the first image and the second image according to a result of the translation compensation; and fuse the common area of the first image and the second image to generate the third image.

\* \* \* \* \*